Feb. 22, 1927.
H. I. WRIGLEY
1,618,740
BRAKE MECHANISM FOR RAILWAY CARS
Filed Feb. 8, 1926
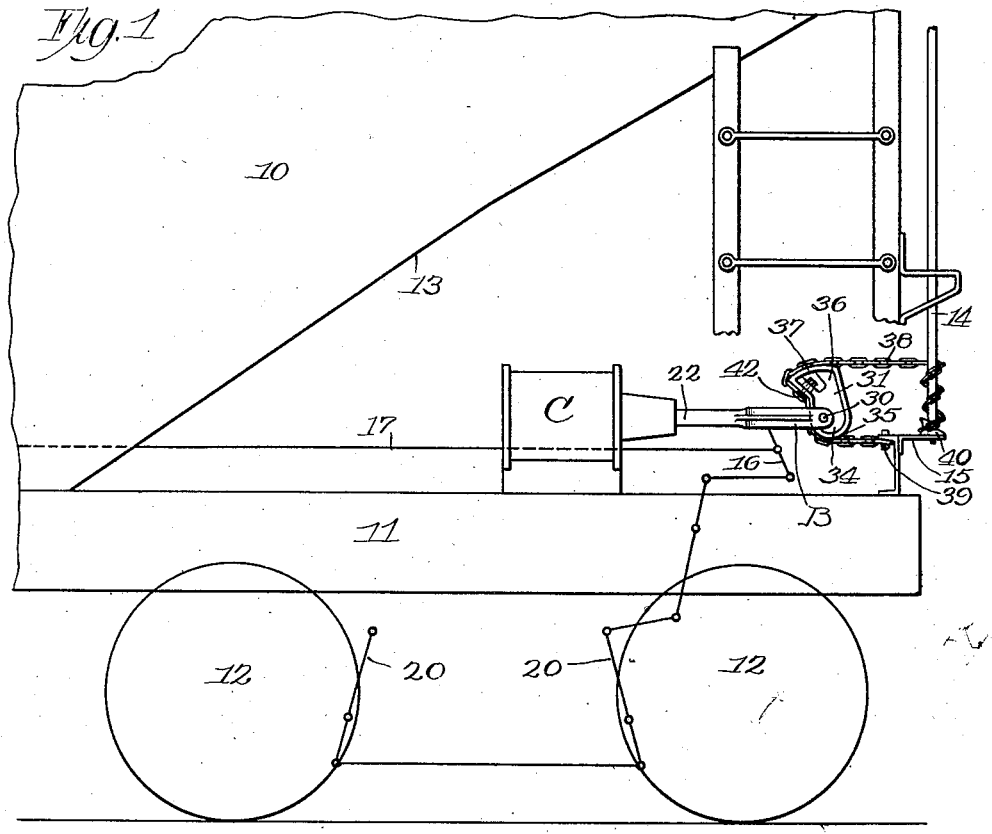
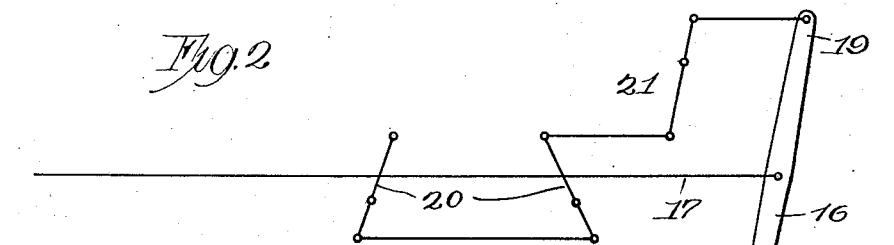
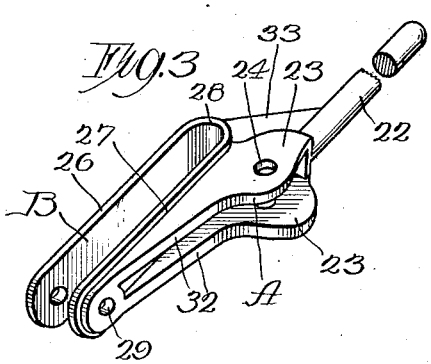
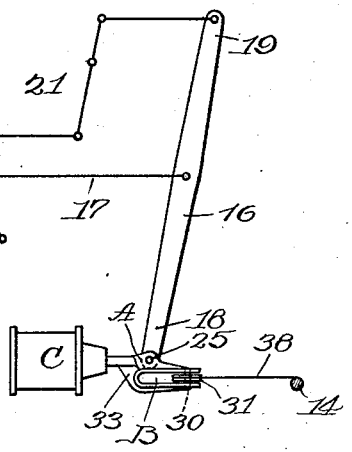
Inventor:
Henry I. Wrigley Patented Feb. 22, 1927.

1,618,740

UNITED STATES PATENT OFFICE.

HENRY I. WRIGLEY, OF CHICAGO, ILLINOIS, ASSIGNOR TO UNIVERSAL DRAFT GEAR ATTACHMENT CO., A CORPORATION OF ILLINOIS.

BRAKE MECHANISM FOR RAILWAY CARS.

Application filed February 8, 1926. Serial No. 86,830.

The principal object of this invention is to facilitate the addition of a multiplying lever to the hand brake mechanism of hopper cars when the cylinder lever is substantially horizontal and the brake cylinder is adjacent to the ends of the car.

The preferred embodiment for this purpose is shown in the accompanying drawings, of which—

Fig. 1 is a side elevation of an end portion of a hopper car with the foundation brake gear shown diagrammatically, and the brake cylinder and hand power winding mechanism in about the relation they ordinarily assume in this type of car.

Fig. 2 is a plan view of the hand brake, the air brake cylinder, the horizontal cylinder lever of the foundation brake gear, and the remainder of the foundation brake gear in diagram without respect to the plane in which the parts lie, and Fig. 3 is a perspective view of a push rod especially adapted for use in applying the invention to this type of car.

But it is to be understood that this specific illustration and the specific description to follow are used to make the disclosure clear and that the invention in this, or other forms, is applicable to other types of brake mechanisms, and it is not intended to limit the patent other than is made necessary by the prior art.

Referring to these drawings, 10 indicates a portion of a hopper car body mounted upon a frame 11 carried by trucks diagrammatically illustrated by the wheels 12. In this type of car the air brake cylinder C is usually mounted adjacent to one end of the frame below the inclined bottom 13 of the hopper body and the hand power mechanism illustrated by the brake shaft 14 is rotatably mounted on a bracket 15 beyond the end of the body.

In one type of foundation brake gear in common use, the cylinder lever 16 is arranged substantially horizontal with its intermediate portion connected by a rod 17 with a lever having a fixed fulcrum at the other end of the car (not shown) and with one end 18 connected with the cylinder push rod and the other end 19 connected with the brake beam levers 20 by links and levers generally indicated at 21.

According to this invention the usual brake cylinder push rod is replaced by a similar structure having an additional jaw for the reception of a multiplying lever for the hand brake mechanism. The new push rod, as shown in perspective in Fig. 3, and in plan in Fig. 2, includes a rod proper 22 from one end of which spaced horizontal flanges 23 project to form a jaw generally indicated by the letter A corresponding to the usual jaw and perforated at 24 to receive a pin 25, Fig. 3, aligned with the axis of the rod 22 for connecting the push rod and the cylinder lever in proper pivotal relation. It also includes vertically arranged flanges 26 and 27 spaced apart and connected at their rear ends by a rounded base 28 to form a jaw, generally indicated by the letter B which is perforated adjacent to the free end at 29 to receive a pin 30 for establishing a pivotal connection with a multiplying lever 31.

The flanges 23 are extended as indicated at 32 to form gusset braces for the flange 27 and another gusset brace 33 extends along the outside of the flange 26 across the base 28 and joins the push rod adjacent to its end, as best shown in the plan view Fig. 2.

The multiplying lever 31 preferably is of the type shown in my Patent No. 1,567,407 of December 29, 1925, though a great variety of other types may be used.

This lever has a short arm 34 provided with a rounded and grooved surface 35 of relatively short radius and a long arm 36 having a rounded and grooved surface 37 of relatively long radius, the whole lever forming a sheave adapted to rotate under the influence of a brake chain 38 formed into a bight about the sheave with one end anchored at 39 and the other end in winding engagement with the spiral drum 40 on the brake shaft 14. In order to prevent the chain from shifting along the surface of the sheave it is made fast at one side thereof by a suitable shackle 42.

When the brakes are released the multiplying lever 31 is in a position about 180° counter-clockwise from that shown in Fig. 1, presenting the lever arm to the upper portion of the chain as it appears in that figure and the long lever arm to the lower portion of the chain. A very little rotation of the shaft 14 will, therefore, serve to rapidly shift the position of the multiplying lever, take up the slack, and present the lever in approximately the position it appears in Fig. 2, where it will multiply the force applied to the brake shaft and serve to apply the brakes with pressure comparable to that of the air cylinder C.

From Figs. 1 and 2 it will be clear that the space available for an auxiliary lever in the hand brake mechanism is extremely limited, and that the present invention permits a very powerful multiplying lever to be mounted and to operate within this space. It will also be obvious that the improved push rod will permit auxiliary levers to be readily mounted for use in connection with other types of foundation brake gears.

I claim as my invention:

1. In a brake mechanism for railway cars of the type wherein a foundation brake gear including a substantially horizontal cylinder lever is operated by the push rod of an air cylinder and a hand operated winding mechanism, the combination of an auxiliary jaw on the push rod and extending parallel thereto alongside of the connection with the horizontal lever, a multiplying lever pivoted in the auxiliary jaw to rotate about a horizontal axis and cooperating with the winding mechanism.

2. In a brake mechanism for hopper cars of the type wherein an air cylinder mounted between the inclined bottom of the body and the end of the car has a push rod that operates a foundation brake gear including a substantially horizontal cylinder lever which is also operated by a hand power winding mechanism, the combination of a jaw offset from the push rod at the side opposite to the cylinder lever and extending transversely to a projection of the cylinder lever, a sheave in the form of a reversible lever mounted in the jaw and cooperating with the winding mechanism, and a chain formed into a bight about said sheave with one end anchored and the other end connected with the winding mechanism.

3. In a device of the class described, a commercial unit comprising a push rod, horizontal flanges adjacent to one end of the rod spaced apart to form a jaw for receiving a cylinder lever and vertical flanges at one side of the horizontal flanges spaced to form a jaw to receive a multiplying lever.

4. In a device of the class described, a commercial unit comprising a push rod, horizontal flanges projecting from one end of the rod and spaced apart to form a jaw for connection with a cylinder lever, vertical flanges alongside the horizontal flanges and spaced apart to form a jaw for receiving a multiplying lever and gusset bracing for the flanges.

5. In a brake mechanism for hopper cars of the type wherein an air cylinder mounted between the inclined bottom of the body and the end of the car has a push rod equipped with a jaw to receive a substantially horizontal cylinder lever, the combination of winding mechanism, an auxiliary jaw on the push rod alongside the first-mentioned jaw, a sheave in the form of a reversible lever mounted in the auxiliary jaw, and a chain formed into a bight about the sheave with one end anchored and the other end connected with the winding mechanism.

In witness whereof I affix my signature.

HENRY I. WRIGLEY.